(12) United States Patent
Dodds et al.

(10) Patent No.: US 11,352,702 B2
(45) Date of Patent: Jun. 7, 2022

(54) CORROSION INHIBITOR

(71) Applicant: HEXIGONE INHIBITORS LTD, Swansea (GB)

(72) Inventors: Patrick Dodds, Carmarthenshire (GB); Geraint Williams, Carmarthen (GB)

(73) Assignee: Hexigone Inhibitors LTD, Swansea (GB)

( * ) Notice: Subject to any disclaimer, the term of this patent is extended or adjusted under 35 U.S.C. 154(b) by 0 days.

(21) Appl. No.: 15/768,152

(22) PCT Filed: Oct. 14, 2016

(86) PCT No.: PCT/GB2016/053184
§ 371 (c)(1),
(2) Date: Apr. 13, 2018

(87) PCT Pub. No.: WO2017/064499
PCT Pub. Date: Apr. 20, 2017

(65) Prior Publication Data
US 2018/0312981 A1 Nov. 1, 2018

(30) Foreign Application Priority Data

Oct. 14, 2015 (GB) ...................................... 1518168

(51) Int. Cl.
| | | |
|---|---|---|
| C23F 11/14 | (2006.01) | |
| C23F 11/173 | (2006.01) | |
| C09D 5/08 | (2006.01) | |
| C09D 129/14 | (2006.01) | |
| B01J 41/07 | (2017.01) | |
| B01J 41/14 | (2006.01) | |
| C23F 11/00 | (2006.01) | |
| C23F 11/08 | (2006.01) | |
| B01J 47/018 | (2017.01) | |

(52) U.S. Cl.
CPC ............. *C23F 11/149* (2013.01); *B01J 41/07* (2017.01); *B01J 41/14* (2013.01); *B01J 47/018* (2017.01); *C09D 5/086* (2013.01); *C09D 129/14* (2013.01); *C23F 11/00* (2013.01); *C23F 11/08* (2013.01); *C23F 11/173* (2013.01)

(58) Field of Classification Search
None
See application file for complete search history.

(56) References Cited

U.S. PATENT DOCUMENTS

| | | | | |
|---|---|---|---|---|
| 3,899,624 A | * | 8/1975 | Sutherland | .............. B63B 59/04 |
| | | | | 428/327 |
| 4,612,049 A | | 9/1986 | Berner et al. | |
| 4,775,588 A | * | 10/1988 | Ishii | ......................... B05D 5/04 |
| | | | | 427/240 |
| 5,132,093 A | | 7/1992 | Hettiarachchi et al. | |
| 5,266,230 A | * | 11/1993 | Tomizawa | ......... C10M 171/001 |
| | | | | 252/572 |
| 7,578,878 B2 | | 8/2009 | Sinko et al. | |
| 2004/0086757 A1 | * | 5/2004 | Mohapatra | ............... C09K 5/10 |
| | | | | 429/437 |
| 2006/0049167 A1 | | 3/2006 | Yang et al. | |
| 2007/0075120 A1 | * | 4/2007 | Yang | ..................... C23F 11/124 |
| | | | | 228/101 |
| 2012/0085261 A1 | | 4/2012 | Barbe et al. | |
| 2012/0270129 A1 | * | 10/2012 | Marinho | .................. B01J 41/04 |
| | | | | 429/434 |
| 2012/0288404 A1 | | 11/2012 | Yang et al. | |

FOREIGN PATENT DOCUMENTS

| | | | | |
|---|---|---|---|---|
| CN | 102140642 A | | 8/2011 | |
| EP | 0170356 A1 | | 2/1986 | |
| EP | 0349893 A1 | * | 1/1990 | ............... C09K 5/20 |
| EP | 1382721 A1 | | 1/2004 | |
| EP | 2368945 A2 | | 9/2011 | |
| GB | 2081275 A | | 2/1982 | |
| GB | 2527640 A | | 12/2015 | |
| JP | H3215574 A | | 9/1991 | |
| JP | H112050744 A | | 9/1999 | |
| JP | H11279452 A | | 10/1999 | |
| JP | 2007217732 A | | 8/2007 | |
| JP | 2008546910 A | | 12/2008 | |
| KR | 20160011874 A | * | 2/2016 | |
| WO | 03102034 A1 | | 12/2003 | |
| WO | 2005003408 A2 | | 1/2005 | |
| WO | 2006061230 A1 | | 6/2006 | |
| WO | 2007002558 A1 | | 1/2007 | |
| WO | 2010010052 A1 | | 1/2010 | |

(Continued)

OTHER PUBLICATIONS

Amberlite Technical Information Bulletin, date unknown (Year: NPL) (Year: NA).*
Dowex Technical Information Bulletin, date unknown (Year: NPL) (Year: NA).*
Zheludkevich M L et al: "Smart coatings for active corrosion protection based on multi-functional micro and nanocontainers" Electrochimica Acta. vol. 82. May 3, 2012 (May 3, 2012). Pages 314-323.

(Continued)

*Primary Examiner* — Tanisha Diggs
(74) *Attorney, Agent, or Firm* — Dinsmore & Shohl LLP (57) ABSTRACT

The present invention relates to a corrosion inhibitor and inhibitor provided within a coating material for coating a metal, particularly but not exclusively steel. The corrosion inhibitor in a coating particularly protects a sacrificial coating such as zinc or zinc alloy on galvanised steel which in turn therefore provides improved corrosion resistance to the underlying steel. According to an aspect of the invention there is a corrosion inhibitor provided in a polymer binder, the corrosion inhibitor comprising an organic ion in an ion exchange resin.

14 Claims, 7 Drawing Sheets

(56) References Cited

FOREIGN PATENT DOCUMENTS

WO    2012089649  A1    7/2012
WO    2017/064499 A1    4/2017

OTHER PUBLICATIONS

Williams G et al: "Smart release corrosion inhibitor pigments based on organic ion-exchange resins" Corrosion Science. Oxford. GB. vol. 57. Dec. 26, 2011 (Dec. 26, 2011). pp. 139-147.

Kamaraj, K. et al. "Corrosion Protection of Iron Benzoate Doped Polyaniline Containing Coatings" Progress in Organic Coatings 64, 2009, pp. 460-465.

Amberlite IRA402 CI Product Data Sheet, 2008 Rohm and Haas Company.

Barahuie, F. et al. "Development of Drug Delivery Systems Based on Layered Hydroxides for Nanomedicine" International Journal of Molecular Sciences 2014, 15, 7750-7786.

Wikipedia article entitled "Hydrotalcite" retrieved from URL https://en.wikipedia.org/w/index.php?title=Hydrotalcite&oldid=639596367.

Mishra T. et al. "Recent Development in Clay Based Functional Coating for Corrosion Protection" Key Engineering Materials vol. 571 (2013), pp. 93-109.

Third Party Observation for Application No. EP20160784256; date of submission: Oct. 13, 2019.

Third Party Observation for Application No. EP20160784256; date of submission: Dec. 5, 2019.

Database WPI, Week 201630, Thomson Scientific, dated Feb. 24, 2016, 2 pp.

\* cited by examiner

CORROSION INHIBITOR

CROSS-REFERENCE TO RELATED APPLICATIONS

This application is the U.S. national stage of PCT/GB2016/053184 filed Oct. 14, 2016, which claims priority of United Kingdom Patent Application 1518168.8 filed Oct. 14, 2015 of which is hereby incorporated by reference in its entirety.

FIELD OF THE INVENTION

The present invention relates to a corrosion inhibitor and a corrosion inhibiting coating provided for coating a metal, particularly but not exclusively steel. The corrosion inhibitor particularly protects a sacrificial coating such as zinc or zinc alloy on galvanised steel which in turn therefore provides improved corrosion resistance to the underlying steel.

BACKGROUND OF THE INVENTION

Figure 1:
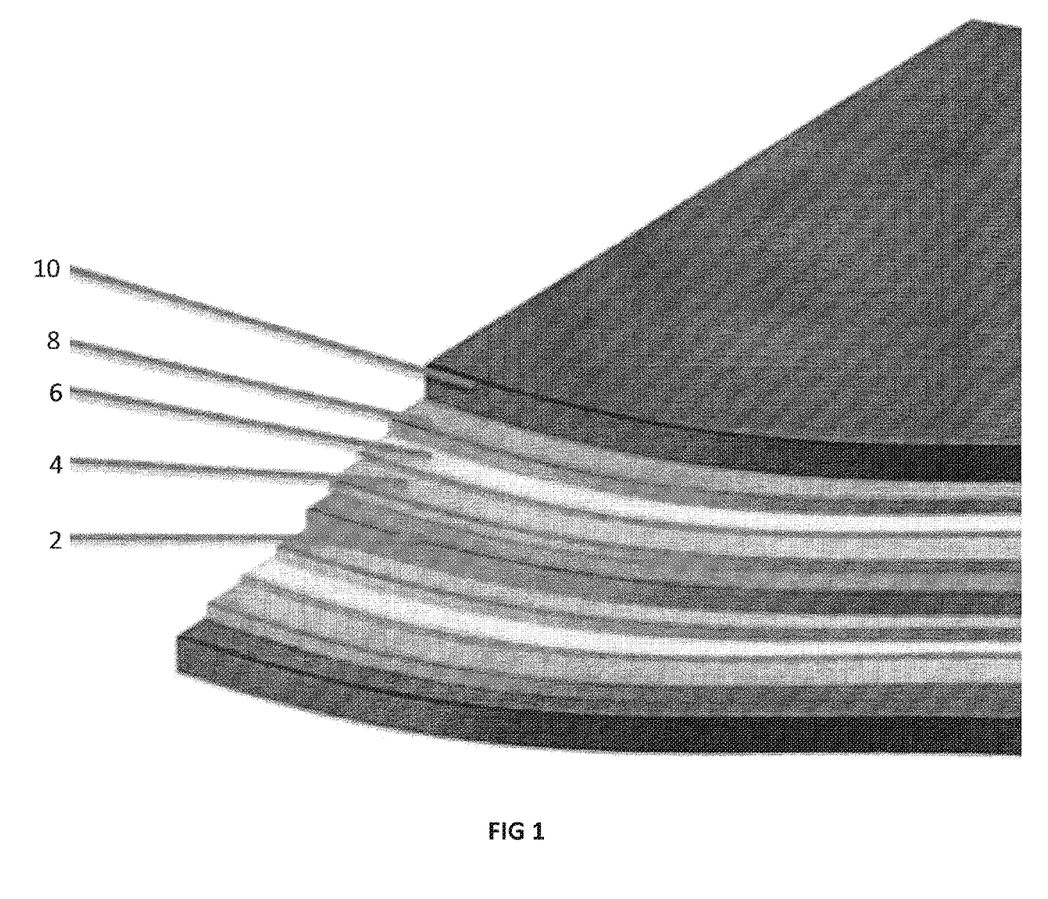
FIG. 1 shows: a schematic exploded view of a typical metal substrate and coating layers.
Figure 2:
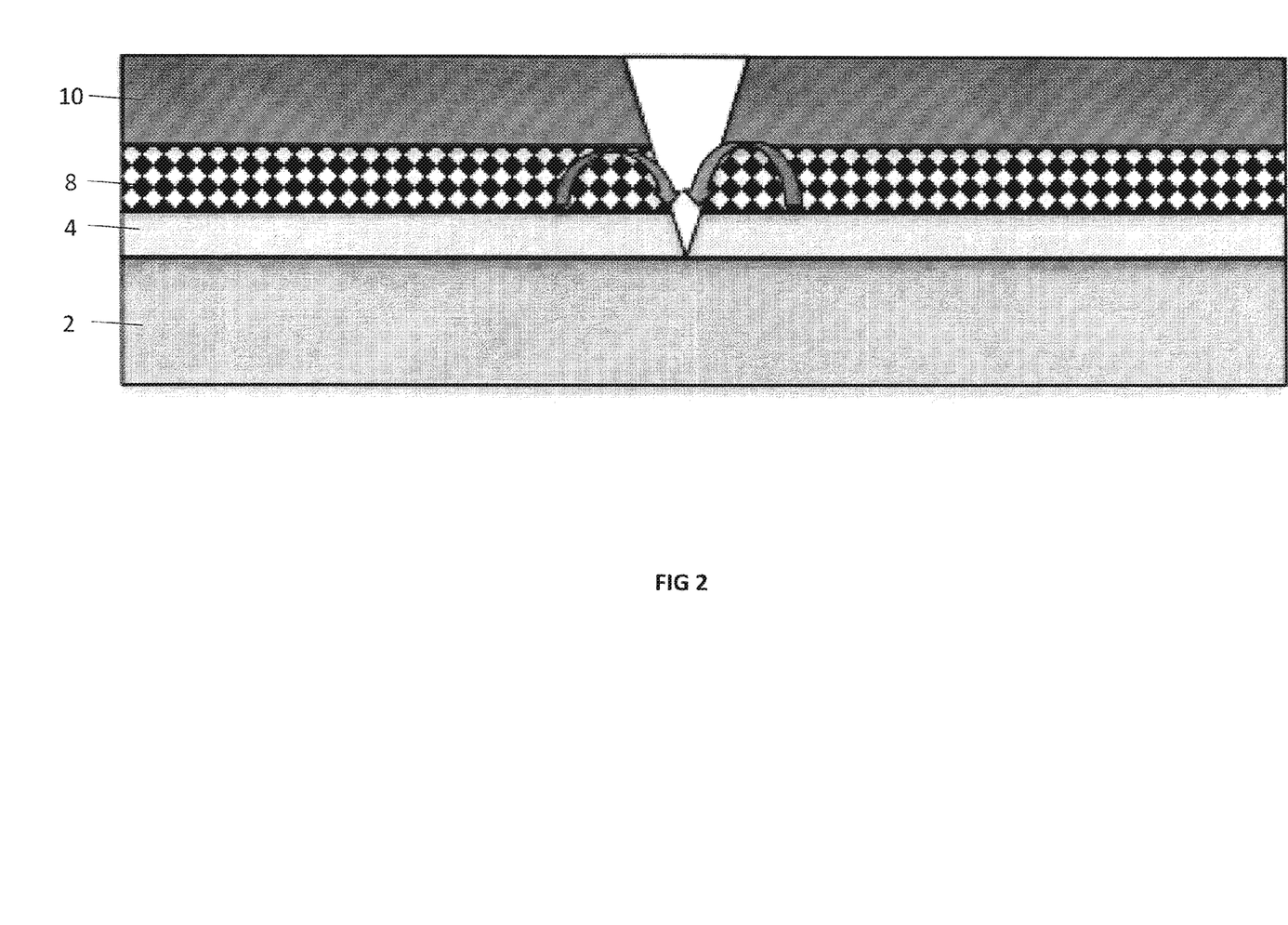
FIG. 2 shows: the action of corrosion inhibitor in the event of a breach of coating layers to reach the metal substrate.

Corrosion inhibitors sometimes referred to as corrosion inhibitive pigments in the form of sparingly soluble inorganic salt powders, dispersed within an organic coating have been traditionally used to protect a wide range of metallic surfaces, including steel and galvanised steel. A typical steel coating system is shown in FIG. 1 and comprises a steel substrate 2, a metallic coating 4 (to sacrificially protect the steel substrate, typically comprising zinc or a zinc alloy), a conversion coating 6 (to provide improved adhesion between the metallic coating and organic coating, as well as to provide corrosion inhibition), a primer 8 and a barrier 10 (typically comprising a polymeric coating). The primer typically comprises a polymer and solvent mixed with a corrosion inhibitor such as zinc or strontium chromate. In the event of rupture of the barrier materials as shown in FIG. 2, inhibitive species derived from the zinc or strontium chromate leach out of the primer 2 and form a precipitate or protective layer around the point of rupture, thus protecting the underlying steel substrate 2. This is represented in FIG. 2.

Current anti-corrosion inhibitors comprise sparingly soluble chromium salts such as zinc or strontium chromate, which have a degree of toxicity which is not environmentally acceptable. Although alternative, environmentally acceptable (Cr (vi)-free) inhibitive pigments, typically based on sparingly soluble phosphate slat technologies are available, they are invariably less effective than their chromate counterparts. In addition, inhibitive species are progressively leached out over time, leading to a loss of coating barrier protection, whereas it would be more desirable to store the corrosion inhibitive species within the coating until such point as they are required (i.e so-called "on-demand" release). JP 112050744 describes the use of benzatriazole (BTA) which is incorporated in a film that is laid over a copper surface. Copper or copper alloy materials have a natural coating of a thin copper oxide on their surface and the BTA molecule forms a covalent bond with the copper oxide to form a strong BTA polymer film on the surface of the copper or copper alloy material. The film is a discrete coating layer that prevents the ingress of water and air onto the surface of the metal. However, if that coating is breached then the film does not act by any kind of chemical reaction to prevent corrosion occurring, but instead the remaining film acts to retain moisture on the underlying metal surface accelerating corrosion.

The present invention seeks to overcome the problems of the prior art by providing a corrosion inhibitor and a coating including a corrosion inhibitor that can be released from a coating as and when it is needed (i.e. a 'smart' or "on-demand" inhibitor), and is also more effective and environmentally acceptable than known inhibitors and inhibitor bearing coatings or primers.

SUMMARY OF THE INVENTION

According to an aspect of the present invention there is a corrosion inhibitor comprising an organic ion in an ion exchange resin.

Also according to the present invention there is provided a coating for a metal substrate comprising a corrosion inhibitor provided in a polymer binder, the corrosion inhibitor comprising an organic ion in an ion exchange resin.

The corrosion inhibitor may be combined with a polymer binder to form a coating for application to a substrate.

The coating may be applied to a metal substrate as part of a coating system, such that other materials or additives may be provided in the coating, and/or additional coating layers may be applied to the substrate. The coating may be termed a primer.

Organic ions are any ions that fit the general definition of an organic compound, which comprise at least carbon and hydrogen atoms. An organic ion in an ion exchange resin provides a corrosion inhibitor having the beneficial properties of acting as a smart release corrosion inhibitor with improved capability for providing corrosion resistance whilst also being environmentally acceptable. Such a corrosion inhibitor is capable of allowing dissociation of the organic ion from the ion exchange resin under the conditions of a corrosive electrolyte becoming present, and sequesters ions that have formed as a result of corrosion to form a precipitate or barrier layer to prevent further corrosion.

In the protection of galvanised steel, the organic ion dissociates to provide protection to be zinc or zinc oxide sacrificial layer. This improves the lifespan of the sacrificial layer.

The organic ion is preferably an azole or oxime, where an azole is characterized as any of numerous compounds characterized by a five membered ring containing at least one nitrogen atom. The organic ion is preferably benzotriazolate or derivatives thereof, such as 5 methyl benzotriazolate and others. Benzatriazole is a solid provided as a powder at room temperature and pressure, and disassociation to make benzatrizolate is achieved through removal of a positive hydrogen ion to achieve negatively charged benzatriazolate which is then attracted to the ion exchange resin to provide a corrosion inhibitor. An organic ion comprising a benzene ring, particularly benzotriazolate has been found to be beneficial. The azole group at one end forms a bond with the metallic surface and also metallic ions released the anodic dissolution. The adsorbed benzotriazole is thought to stifle electron transfer reactions while the precipitate formed by reaction of benzotriazolate anions with metal cations forms an inhibitive film which blocks the surface to further corrosive attack.

The organic ion may alternatively be an oxime such as salicylaldoxime.

The ion exchange resin, sometimes referred to as an ion exchange polymer, is an insoluble matrix preferably formed of a plurality of particles, often referred to as beads. These beads may have a diameter of 0.5-1 mm diameter. The ion exchange resin provides ion exchange sites.

Preferably the ion exchange resin is an organic anion exchange resin. It is envisaged that the organic ion exchange resin may be divinylbenzene or cross linked polystyrene. It has been found beneficial that the organic ion exchange resin is an organic anion exchange resin which attracts the organic ion to provide the corrosion inhibitor.

It is preferred that the divinylbenzene is a styrene divinylbenzene copolymer having a trimethyl ammonium functional group.

Preferably for use the corrosion inhibitor is contained in a polymer binder. The polymer binder acts to carry the corrosion inhibitor, and bind it within the polymer. The polymer is beneficially liquid at room temperature and pressure. The corrosion inhibitor is beneficially solid at room temperature and pressure, and is dispersed through the polymer binder. The polymer binder may be selected from one or more of an acrylic, polyurethane or polyvinyl butyral.

The solid, preferably particulate corrosion inhibitor incorporated into the polymer binder forms an organic paint, coating or primer. This paint or coating can then be used to coat a substrate, such as a metal object e.g. a sheet.

The particulate size of the corrosion inhibitor is preferably less than 100 microns, even more preferably less than 50 microns, preferably less than 20 microns, and preferably less than 5 microns depending on the coating application. The particulate corrosion inhibitor is preferably dispersed through a polymer binder.

It is envisaged that the ratio of organic ion to ion exchange resin matrix is approximately 10% by wt of organic ion to ion exchange resin matrix. An example of a suitable composition is 100 ml of 0.25M pH 8.2 benzotriazole in deionised water per 10 g of inhibitor.

The coating may further comprise a second corrosion inhibitor comprising an inorganic cation in a cation exchange resin which may work in synergistic action. This may be incorporated in order to provide a store for inhibiting cations. The benefit of this is to prevent corrosion induced coating failure at points where the coating is breached. This second corrosion inhibitor is capable of blocking cathodic disbondment or filiform corrosion.

A suitable inorganic cation may be a cation that forms highly insoluble precipitates with hydroxide anions, examples of which are cobalt, calcium, cerium, zinc and magnesium.

The cation exchange resin may for example be a divinyl benzene matrix with a sulphonated functional group. A sulphonated group is beneficial as maintains a negative charge holding the cation in place.

An aspect of the present invention may also be defined as an additive for addition to a coating for imparting corrosion resistance upon a substrate comprising a first corrosion inhibitor comprising an organic ion in an ion exchange resin and a second corrosion inhibitor comprising an inorganic cation in a cation exchange resin.

The first and second corrosion inhibitors may be in a mixed, preferably in particulate form. They may be added either together or separately to a polymer binder to produce a coating. The particulate size of the second corrosion inhibitor may be the same or similar to that of the first corrosion inhibitor.

Also according to the present invention there is a method of manufacturing a corrosion inhibitor comprising the step of combining organic ions with an ion exchange resin.

Also according to the present invention there is a method of manufacturing a coating for a metal substrate comprising the steps of combining organic ions with an ion exchange resin to form a corrosion inhibitor and combining the corrosion inhibitor with a polymer binder.

The organic ions are beneficially provided in solution and the method preferably further comprises the step of combining the ion exchange resin with the solution. The ion exchange resin is beneficially in a solid form. A plurality of modified solid beads are formed as a result of ion exchange. The combination of organic ions and ion exchange resin matrix are preferably mixed.

The method preferably further comprises filtering the ion exchange resin beads from the solution, and preferably further comprises drying the beads. The beads are preferably heat treated.

The method preferably further comprises breaking up the beads into smaller particles, which may be achieved through a variety of mechanical methods such as milling. A powder is beneficially produced by the mechanical breaking up of the beads.

The organic ions are preferably produced by dissolving an organic compound into solution, the organic compound being capable of disassociating into at least two ions, one of the ions being the organic ion, wherein the solution has a pH of at least 7.6 or less than 3. A pH of greater than 8.3 is preferred. Increasing the pH of the solution may be achieved by adding an alkaline material such as sodium hydroxide to the solution.

The organic ions are preferably an azole and preferably comprise benzotriazolate. The ion exchange resin matrix is preferably an organic anion exchange resin matrix, preferably divinylbenzene.

The method may further comprise the steps of combining a second corrosion inhibitor formed by combining an inorganic cation with a cation exchange resin to the coating.

BRIEF DESCRIPTION OF THE DRAWINGS

An embodiment of the invention will now be described by way of example only with reference to and as illustrated in the following figures and examples in which.

DETAILED DESCRIPTION OF AN EMBODIMENT OF THE INVENTION

The present invention has been developed to provide a smart-release corrosion inhibitor which has particular but not exclusive application in the protection of galvanised steel from corrosion. The inhibitor, which is usually applied as a primer to a metal surface in liquid form at room temperature and pressure contains an organic ion, preferably an azole, and even more preferably benzotriazolate (BTA). This is added to an ion exchange matrix. The ion exchange resin matrix in one embodiment is a divinylbenzene copolymer with a trimethyl ammonium functional group as shown below. The benzene ring with the three nitrogen atoms is benzatriazolate and is negatively charged due to removal of the hydrogen cation. The ion exchange resin matrix is the remainder and is shown as being positively charged.

The corrosion inhibitor structure is formed of repeating unit of the ion exchange resin with quaternary ammonium functional group with +ve charge to hold inhibiting anion (X–) of benzotriazolate in place until negatively charged corrosion electrolyte ions are present.

To make the corrosion inhibitor, benzotriazole is dissolved in water at a molar concentration of 0.25M, the pH is adjusted using NaOH to a pH of at least 8.3. A suitable amount through experimentation of benzatriazole is 29.78 g per litre of water. Altering the pH to greater than 8.3 activates benzotriazole into benzotriazolate by causing dissociation of a hydrogen ion. An amount of the solution is taken which may be at room temperature, or it can also be heated, for example to 40 degrees Celsius and divinylbenzene copolymer with a trimethyl ammonium functional group is added to the solution. 10 g of the divinylbenzene copolymer is added to 100 ml of the solution containing the benzotriazole. The mixture is stirred, typically for an hour and left to settle so that beads are formed. Once the beads have settled the supernatant solution is decanted off and replaced with more 0.25M pH 8.2 benzotriazole solution in the ratio of 100 ml to 10 g of original weight of exchanger. This encourages more ion exchange. The topped up solution is stirred for another period, typically an hour and any supernatant left after a further period of settling is decanted and replaced with further solution. The topped up solution is stirred further, for example for a further four hours to ensure saturation of BTA within the matrix. The resultant beads are filtered off and washed with de-ionised water. This process ensures the exchange of the Cl anion of the divinylbenzene copolymer with the benzotriazolate is maximised.

The beads contain a BTA in a divinyl benzene matrix. The beads are then dried overnight at 40 degrees Celsius and then ball milled (typically for 1 hour) to achieve a powdered form that can be added to a coating such as a primer coating. The powdered material that is formed may be added to a primer at a range of 1-30% w/w.

The production of an inorganic cation in a cation exchange resin to provide an optional second corrosion inhibitor within the polymer binder, which may act synergistically and may be achieved by the following procedure: Cation exchange resin beads (e.g. Amberlite™ or Dowex™) were dispersed in 1 mol $dm^{-3}$ aqueous solutions of the relevant metal chloride salt and the resulting suspensions stirred for 2 h. The suspensions were subsequently left to settle overnight and the supernatant decanted. The resin beads were exhaustively washed by repeated cycles of centrifugation and re-dispersion in fresh distilled water, until no chloride ions could be detected in the supernatant by silver nitrate aqueous solution testing. Finally the resin beads were dried in air and ground in a planetary mill to give a particle size of <5 microns diameter. The second corrosion inhibitor may then be incorporated with the polymer binder and first corrosion inhibitor.

The primer may be used in a multi-layer system on coated Hot Dip Galvanised (HDG) Steel, to protect from under-film corrosion. The benzotriazolate is released when it comes into contact with a corrosive electrolyte after which it sequesters the electrolyte ions. Typically the primer is used on a zinc or zinc alloy surface and forms a protective layer by adhering onto the zinc surface. If there is any corrosion, the organic exchange matrix will sequester ions that have been formed as a result of the corrosion and by having the active agent in a matrix, there is also slow release of benzotriazole.

A series of coatings was prepared by dispersing various volume fractions of the corrosion inhibitor formed of benzatriazole in an ion exchange resin matrix, which is then mixed in a polyvinyl butyral binder. This mixture was then applied to HDG steel and an in situ scanning Kelvin probe was used to evaluate the efficiency of the mixtures in inhibiting corrosion driven coating failures by cathodic delamination. Preliminary screening of the corrosion inhibitors at a fixed pigment volume fraction of 0.1 PVF (amount in volume of the inhibitor within the coating polymer) showed that anions and in particular organic anions slowed the delamination rate compared with a formulation where there was no binder which indicates the positive action of the anions. Anions from benzotriazole were unexpectedly by far the most effective. The $Cl^-$ anions present are sequestered into the coating and benzotriazole released simultaneously into the defect electrolyte, forming a precipitate with $Zn^{2+}$ ($Zn(BTA)_2$). The $OH^-$ ions produced at the cathodic delamination front are also sequestered with subsequent release of benzotriazolate, which forms an insoluble precipitate blocking interfacial electron transport. Another effect is that benzotriazole is hydrophobic in nature and binds to the metal surface in a mono layer, which then attracts other benzotriazole molecules, creating a barrier to the electrolyte and oxygen.

As shown in FIG. 1, the effectiveness of a BTA containing anion exchange resin was studied where there are different volume fractions of the BTA ion exchange resin at volume fractions if (i) 0, (ii) 0.02, (iii) 0.05 and (iv) 0.1. A salt solution was used to initiate corrosion which was NaCl at 5% wt/V. The figure shows that there is a marked and progressive decrease in delamination rate with increased matrix loading. In addition the graph of shows the rate of delamination over time and the greater the volume fraction of BTA and anion exchange resin matrix in composition then there is a progressively longer time delay in under-film corrosion being initiated. After delamination has started there is a 30 fold decrease in disbondment rate that results in delamination when there is a 0.1 volume fraction of the matrix formed by BTA and anion exchange resin matrix. The figure shows a transition from parabolic to linear kinetics when the matrix is dispersed within a binder such as is present in a PVB coating which indicates that the mechanism for corrosion inhibition is at least in part due to an under-film interaction of BTA with the underlying zinc layer on which it is coated. The interaction leads to significant blocking of cathodic oxygen reduction. Furthermore BTA acts as an inhibitor when added to a corrosive electrolyte that is present on a metal surface.

FIG. 2 shows that there is an eight fold decrease in the delamination rate constant where there are higher levels of corrosion inhibitor in a mixture applied to a metal surface.

Delamination rates become progressively slower with increasing concentrations of the BTA-ion exchange resin matrix.

Figure 3:
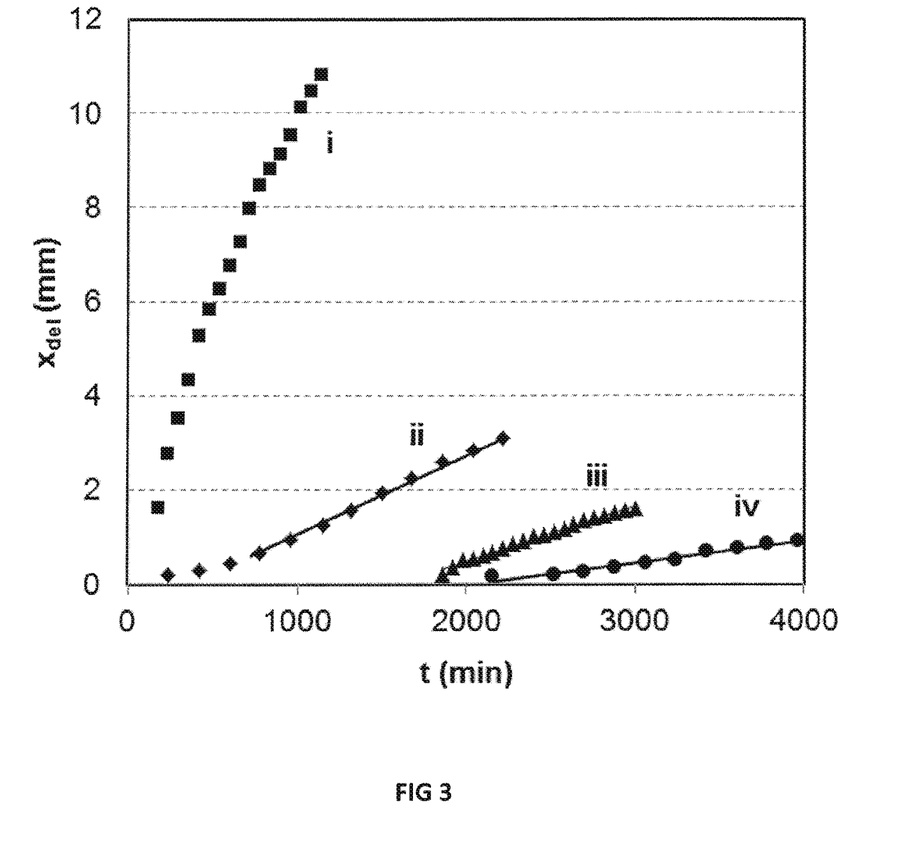
FIG. 3 shows: the delamination rate of a coating on a hot-dip galvanised steel (HDG) surface according to loading of benzotriazole in the corrosion inhibitor according to an embodiment of the invention.

In FIG. 3, we see the effect of known corrosion inhibitors with the corrosion inhibitor of the present invention the coating are—strontium chromate (industry standard inhibitor), chromate containing exchange matrix, zinc phosphate (current best chrome free alternative) and uninhibited once the delamination has initiated. Plot (i) shows an un-inhibited coating which has minimal effect on delamination. Plot (ii) shows the effect of a coating with 0.15% of zinc phosphate, while plot (iii) shows a standard coating of strontium chromate. Plot (iv) shows a coating of Amberjet (which is an copolymer having an ammonium functional group) chromate, while finally plot (v) shows a plot for a coating of the present invention. As can be seen, once delamination i.e. corrosion has started, the spread of the delamination is much less with the composition of the present invention as shown by plot v. The distance that delamination can travel is a maximum of 850 μm, the next best result is for Amberjet chromate which travels 2150 μm. This shows that the present invention performs much better than industry standard formulations such as strontium chromate or similar compositions such as the Amberjet chromate, which confirms that the matrix of the present invention has an improved technical effect over existing inhibitors.

Figure 4:
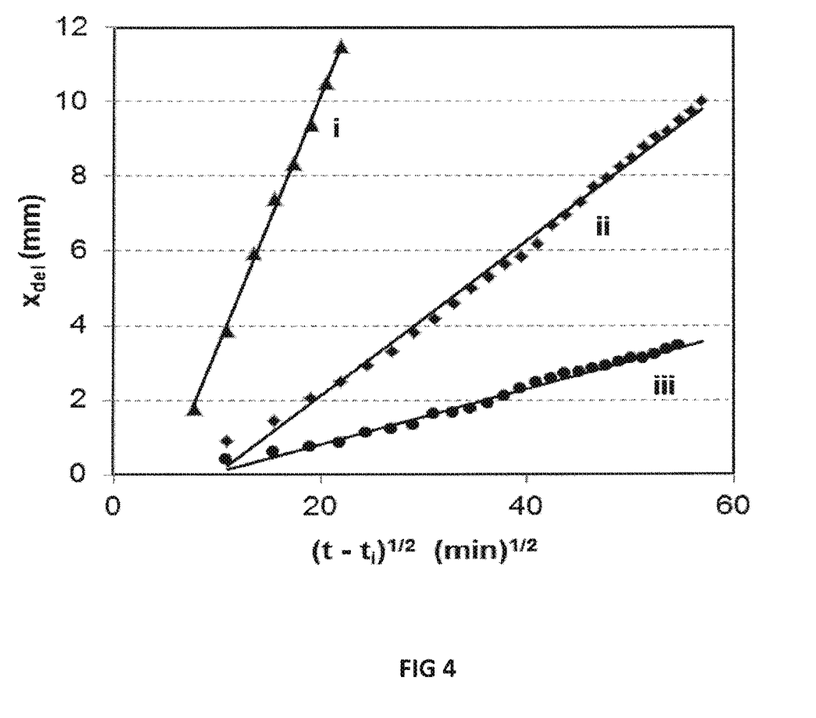
FIG. 4 shows: the delamination rate of a coating on a hot-dip galvanised steel (HDG) surface with increasing concentrations of benzotriazole in the corrosion inhibitor.

FIG. 4 shows that the presence of 2% by pigment volume of the Amb-BTA pigment in the system, vastly affects the initial rate of delamination ($k_{del}$) when compared to the unpigmented, with a small increasing effect with Amb-BTA content 0.05 and 0.1. The change in effect of the higher 5% and 10% by volume of Amb-BTA pigment is due to the delay in the onset of corrosion as well as the reduced the rate of corrosion.

Figure 5:
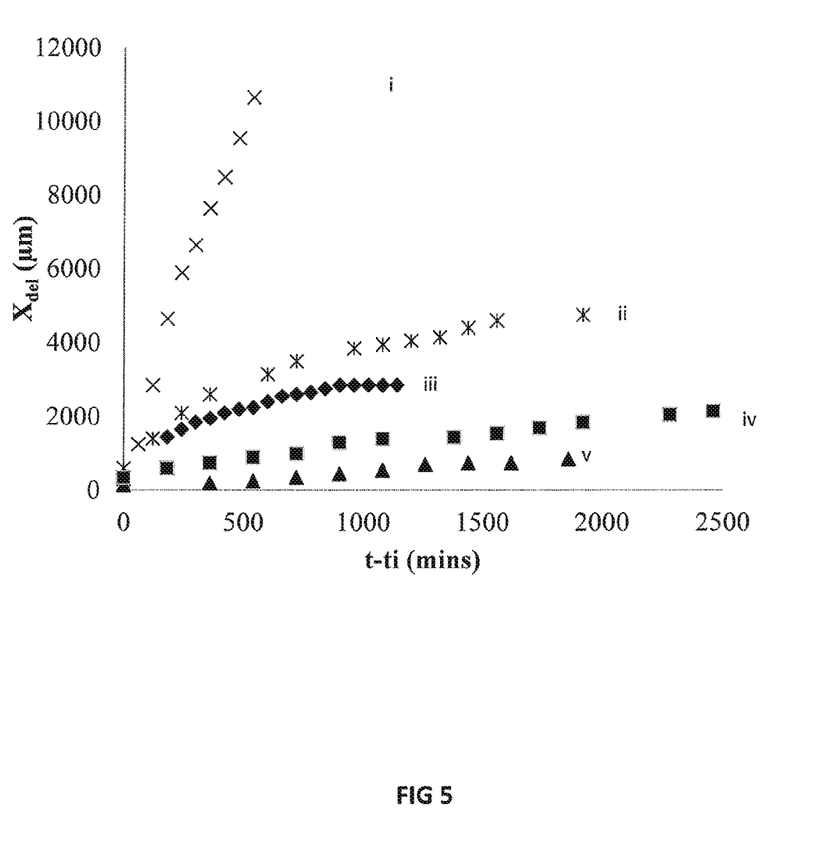
FIG. 5 shows: a comparison of different compositions that are used as corrosion inhibitors and the effect on delamination once initiated.
Figure 6:
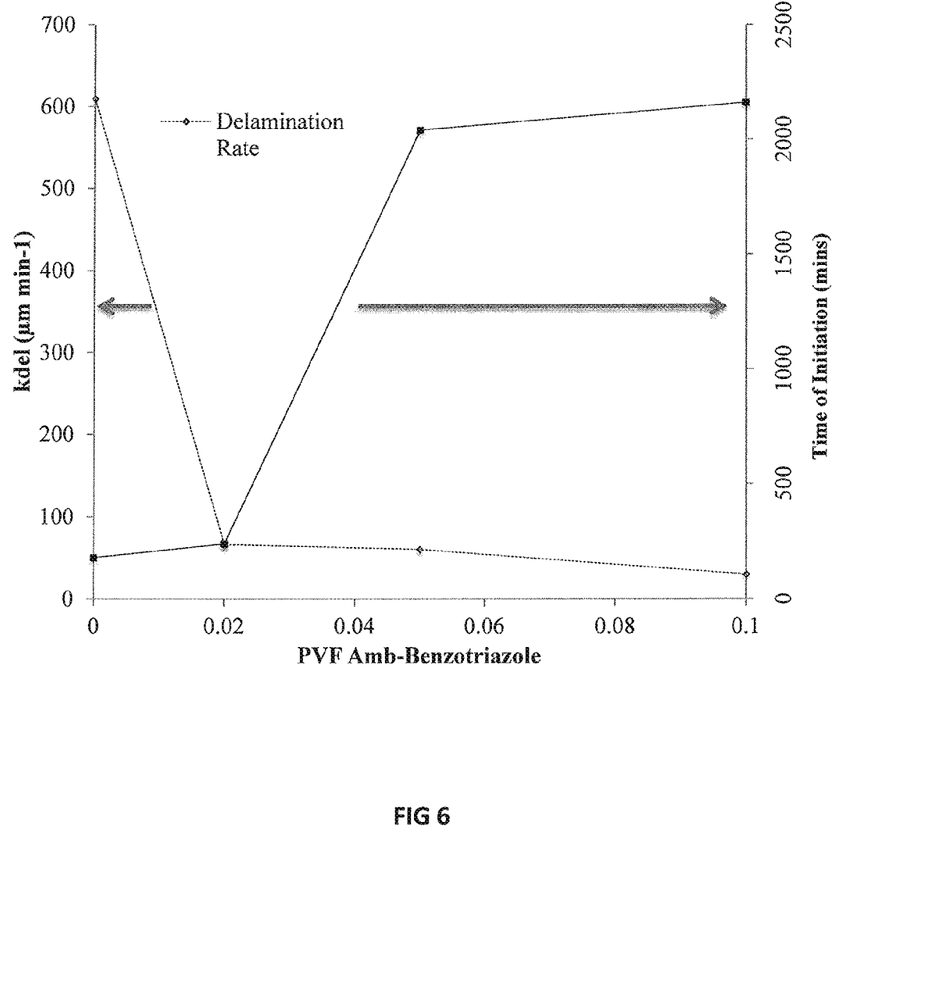
FIG. 6 shows: the effects of a corrosion inhibitor on the time of initiation of delamination and the delamination rate.
Figure 7:
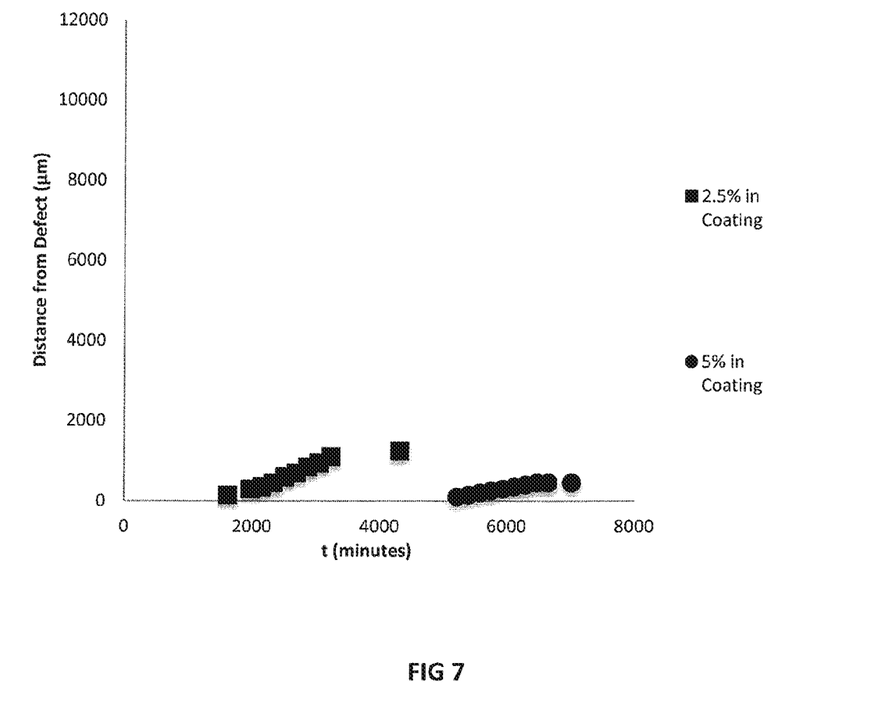
FIG. 7 shows: the effect of concentration of corrosion inhibitors with varying amounts of active matrix.

Finally, FIG. 5 shows the delamination rate with direct w/w addition of the corrosion inhibitor to a polyvinyl butyl solution and this showed that the rate of delamination is very low and also that increasing the w/w % of the corrosion inhibitor in the solution results in an increased amount of time before the delamination corrosion starts. This again shows the efficacy of the corrosion inhibitor according to the invention and the effect it has on reducing and delaying onset of delamination.

Although the invention has been shown in and with certain specific embodiments, it will be readily apparent to those skilled in the art that various changes in form and arrangement of parts may be made to suit requirements without departing from the scope of the invention afforded by the appended claims.

The invention claimed is:

1. A coating for a metal substrate comprising:
a polymer binder; and
a corrosion inhibitor, the corrosion inhibitor being a particulate comprising;
benzotriazolate or a derivative thereof ionically bonded to active sites of an ion exchange resin;
wherein a particulate size of the corrosion inhibitor is less than 100 microns.

2. The coating according to claim 1, wherein the ion exchange resin is an organic anion exchange resin matrix.

3. The coating according to claim 2, wherein the organic anion exchange resin matrix is divinylbenzene or cross linked polystyrene.

4. The coating according to claim 3, wherein the divinylbenzene is a styrene divinylbenzene copolymer having a trimethyl ammonium functional group.

5. The coating according to claim 1, wherein the particulate size of the corrosion inhibitor particulates is less than 50 microns, less than 20 microns or less than 5 microns.

6. The coating according to claim 1, wherein a ratio of benzotriazolate to ion exchange resin is approximately 100 ml to 10 g of weight of ion exchange resin.

7. The coating according to claim 1, wherein the polymer binder is selected from one of more of an acrylic, polyurethane or polyvinyl butyral.

8. The coating according to claim 1, further comprising a second corrosion inhibitor comprising an inorganic cation in a cation exchange resin.

9. A coating according to claim 1 in the form of a paint.

10. A coating according to claim 1, wherein the particulates are formed by mechanically breaking up beads of organic exchange resin.

11. A coating for a metal substrate comprising:
a polymer binder; and
corrosion inhibitor particulates dispersed through the polymer binder, the corrosion inhibitor particulates consisting of:
benzotriazolate or a derivative thereof ionically bonded to active sites of an ion exchange resin;
wherein a particulate size of the corrosion inhibitor particulates is less than 100 microns.

12. A coating according to claim 11, wherein the particulates are formed by mechanically breaking up beads of organic exchange resin.

13. An additive for addition to a coating for imparting corrosion resistance upon a substrate, the additive comprising:
a first corrosion inhibitor particulates consisting of:
benzotriazolate or a derivative thereof ionically bonded to active sites of an ion exchange resin;
wherein the first corrosion inhibitor particulates have a particulate size less than 100 microns; and
a second corrosion inhibitor consisting of an inorganic cation ionically bonded to active sites of a cation exchange resin.

14. An additive according to claim 13, wherein the particulates are formed by mechanically breaking up beads of organic exchange resin.

* * * * *